(12) United States Patent
Badrinarayanan et al.

(10) Patent No.: US 11,775,058 B2
(45) Date of Patent: Oct. 3, 2023

(54) METHOD AND SYSTEM FOR PERFORMING EYE TRACKING USING AN OFF-AXIS CAMERA

(71) Applicant: Magic Leap, Inc., Plantation, FL (US)

(72) Inventors: Vijay Badrinarayanan, Mountain View, CA (US); Zhengyang Wu, Bellevue, WA (US); Srivignesh Rajendran, San Francisco, CA (US); Andrew Rabinovich, San Francisco, CA (US)

(73) Assignee: Magic Leap, Inc., Plantation, FL (US)

( * ) Notice: Subject to any disclaimer, the term of this patent is extended or adjusted under 35 U.S.C. 154(b) by 284 days.

(21) Appl. No.: 17/129,669

(22) Filed: Dec. 21, 2020

(65) Prior Publication Data
US 2021/0182554 A1 Jun. 17, 2021

Related U.S. Application Data

(63) Continuation of application No. PCT/US2019/038693, filed on Jun. 24, 2019.
(Continued)

(51) Int. Cl.
*G06T 7/00* (2017.01)
*G06F 3/01* (2006.01)
(Continued)

(52) U.S. Cl.
CPC ............. *G06F 3/013* (2013.01); *G06N 3/08* (2013.01); *G06T 7/0012* (2013.01); *G06T 7/11* (2017.01);
(Continued)

(58) Field of Classification Search
CPC ...... G06V 40/19; G06V 10/764; G06V 10/82; G06V 40/18; G06N 3/08; G06N 3/0454;
(Continued)

(56) References Cited

U.S. PATENT DOCUMENTS 8,878,749 B1 11/2014 Wu et al.
2015/0178939 A1* 6/2015 Bradski .................. H04N 13/00
345/633
(Continued)

FOREIGN PATENT DOCUMENTS

CN 112400148 A 2/2021
EP 3811182 A1 4/2021
(Continued)

OTHER PUBLICATIONS

European Application No. 19821828.1, Extended European Search Report dated Jun. 28, 2021, 7 pages.
(Continued)

*Primary Examiner* — Van D Huynh
(74) *Attorney, Agent, or Firm* — KILPATRICK TOWNSEND & STOCKTON LLP

(57) ABSTRACT

Systems and methods for estimating a gaze vector of an eye using a trained neural network. An input image of the eye may be received from a camera. The input image may be provided to the neural network. Network output data may be generated using the neural network. The network output data may include two-dimensional (2D) pupil data, eye segmentation data, and/or cornea center data. The gaze vector may be computed based on the network output data. The neural network may be previously trained by providing a training input image to the neural network, generating training network output data, receiving ground-truth (GT) data, computing error data based on a difference between the training network output data and the GT data, and modifying the neural network based on the error data.

20 Claims, 13 Drawing Sheets

Related U.S. Application Data

(60) Provisional application No. 62/688,983, filed on Jun. 22, 2018.

(51) Int. Cl.
*G06T 7/11* (2017.01)
*G06N 3/08* (2023.01)
*G06V 40/19* (2022.01)
*G06V 10/764* (2022.01)
*G06V 10/82* (2022.01)
*G06V 40/18* (2022.01)

(52) U.S. Cl.
CPC .......... *G06V 10/764* (2022.01); *G06V 10/82* (2022.01); *G06V 40/18* (2022.01); *G06V 40/19* (2022.01); *G06T 2207/20081* (2013.01); *G06T 2207/20084* (2013.01); *G06T 2207/30041* (2013.01)

(58) Field of Classification Search
CPC .... G06N 3/0445; G06N 3/084; G06T 7/0012; G06T 7/11; G06T 2207/20081; G06T 2207/20084; G06T 2207/30041; G06F 3/013; G06F 3/0304; G06K 9/627
USPC ........................................................ 382/100
See application file for complete search history.

(56) References Cited

U.S. PATENT DOCUMENTS

| | | | | |
|---|---|---|---|---|
| 2015/0346495 | A1* | 12/2015 | Welch ................. | G02B 27/017 345/8 |
| 2016/0026253 | A1* | 1/2016 | Bradski ............... | H04N 13/128 345/8 |
| 2016/0202756 | A1 | 7/2016 | Wu | |
| 2017/0119298 | A1* | 5/2017 | Cheung ................. | G06T 7/246 |
| 2018/0053056 | A1 | 2/2018 | Rabinovich et al. | |
| 2018/0089834 | A1 | 3/2018 | Spizhevoy et al. | |
| 2018/0181809 | A1* | 6/2018 | Ranjan ................. | G06V 10/245 |
| 2018/0300897 | A1 | 10/2018 | Woods et al. | |
| 2019/0073533 | A1* | 3/2019 | Chen ................... | G06V 40/197 |
| 2019/0213434 | A1 | 7/2019 | Zamfir et al. | |
| 2019/0244108 | A1 | 8/2019 | Meyerson et al. | |
| 2019/0295287 | A1* | 9/2019 | De Villers-Sidani ....... | G06V 40/18 |
| 2019/0302883 | A1* | 10/2019 | Greer ....................... | G06T 1/20 |
| 2019/0303722 | A1* | 10/2019 | Linden ..................... | G06T 7/74 |
| 2021/0049410 | A1* | 2/2021 | Dierkes ................... | G06N 3/08 |

FOREIGN PATENT DOCUMENTS

| | | |
|---|---|---|
| EP | 3811182 A4 | 7/2021 |
| JP | 2016106668 A | 6/2016 |
| JP | 2017211891 A | 11/2017 |
| WO | 2018000020 A1 | 1/2018 |
| WO | 2018039269 A1 | 3/2018 |
| WO | 2019246613 A1 | 12/2019 |

OTHER PUBLICATIONS

International Application No. PCT/US2019/038693, International Preliminary Report on Patentability dated Dec. 30, 2020, 10 pages.
International Application No. PCT/US2019/038693, International Search Report and Written Opinion dated Sep. 20, 2019, 7 pages.
Bengio , "Learning Deep Architectures for AI", Foundations and Trends in Machine Learning, vol. 2, No. 1, 2009, pp. 1-127.
Application No. EP20853899.1 , "Extended European Search Report", dated Sep. 9, 2022, 12 pages.
OPENCV: , "SimpleBlobDetector Class Reference, 2D Features Framework/Feature Detection and Description", Available Online at: https://docs.opencv.org/3.4/d0/d7a/classcv_1_1SimpleBlobDeterctor.html, Aug. 19, 2019, 2 pages.
Application No. PCT/US2020/047046 , "International Preliminary Report on Patentability", dated Mar. 3, 2022, 9 pages.
Application No. PCT/US2020/047046 , "International Search Report and Written Opinion", dated Nov. 9, 2020, 10 pages.
Playout et al., "A Novel Weakly Supervised Multitask Architecture for Retinal Lesions Segmentation on Fundus Images", IEEE Transactions on Medical Imaging, vol. 38, No. 10, Oct. 2019, pp. 2434-2444.
Playout et al., "A Novel Weakly Supervised Multitask Architecture for Retinal Lesions Segmentation on Fundus Images—Abstract", IEEE Transactions on Medical Imaging, vol. 38, No. 10 Available Online at : URL:https://pubmed.ncbi.nlm.nih.gov/30908197/, Oct. 2019, 1 page.
Kitazumi et al., "Pupil Detection from Visible Light Corneal Image Using Deep Learning and Application to Gaze Estimation", IPSJ SIG Technical Report, Computer Vision and Image Media (CVIM), Jan. 11, 2018, 8 pages. [English Abstract].
European Application No. 19821828.1, "Office Action", dated May 25, 2023, 7 pages.
Guestrin et al., "General Theory of Remote Gaze Estimation Using the Pupil Center and Corneal Reflections", IEEE Transactions on Biomedical Engineering, vol. 53, No. 6, Jun. 2006, pp. 1124-1133.
Japanese Application No. 2020-570526, "Office Action" and English translation, dated Jun. 30, 2023, 10 pages.

\* cited by examiner

METHOD AND SYSTEM FOR PERFORMING EYE TRACKING USING AN OFF-AXIS CAMERA

CROSS-REFERENCES TO RELATED APPLICATIONS

This application is a continuation of International Patent Application No. PCT/US2019/038693, filed Jun. 24, 2019, entitled "METHOD AND SYSTEM FOR PERFORMING EYE TRACKING USING AN OFF-AXIS CAMERA," which claims the benefit of priority to U.S. Provisional Patent Application No. 62/688,983, filed Jun. 22, 2018, entitled "METHOD AND SYSTEM FOR PERFORMING EYE TRACKING USING AN OFF-AXIS CAMERA," the entire disclosures of which are hereby incorporated by reference, for all purposes, as if fully set forth herein.

BACKGROUND OF THE INVENTION

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR," scenario typically involves presentation of digital or virtual image information without transparency to other actual real-world visual input; an augmented reality, or "AR," scenario typically involves presentation of digital or virtual image information as an augmentation to visualization of the actual world around the user.

Despite the progress made in these display technologies, there is a need in the art for improved methods, systems, and devices related to augmented reality systems, particularly, display systems.

SUMMARY OF THE INVENTION

The present disclosure relates generally to systems and methods for eye tracking. More particularly, embodiments of the present disclosure provide systems and methods for performing eye tracking for gaze estimation in head-mounted virtual reality (VR), mixed reality (MR), and/or augmented reality (AR) devices. Embodiments of the present invention enable the use of energy and bandwidth efficient rendering of content to drive multi-focal displays in a manner that is effective and non-obtrusive to a user's needs. Although the present invention is described in reference to an AR device, the disclosure is applicable to a variety of applications in computer vision and image display systems.

In one aspect of the present invention, a method of estimating a gaze vector using a neural network is provided. The method may include receiving, from a camera, an input image of an eye. The method may also include providing the input image of the eye to the neural network. The method may further include generating, using the neural network, network output data. The method may further include computing, based on the network output data, the gaze vector corresponding to the eye. In some embodiments, the network output data includes one or more of two-dimensional (2D) pupil data, eye segmentation data, and cornea center data. In some embodiments, the 2D pupil data includes a 2D pupil center. In some embodiments, the eye segmentation data includes a segmentation of the eye into a plurality of regions including one or more of a background region, a sclera region, a pupil region, and an iris region. In some embodiments, the cornea center data includes a 2D or 3D cornea center.

In some embodiments, the method further includes computing, based on the 2D pupil data and the eye segmentation data, a three-dimensional (3D) pupil center. In some embodiments, the method further includes computing, based on the 3D pupil center and the cornea center data, an optical axis associated with the eye. In some embodiments, the method further includes computing, based on the optical axis and a calibration angle corresponding to a user, a gaze vector associated with the eye. In some embodiments, the neural network was previously trained by, for each training input image of a plurality of training input images, providing the training input image to the neural network, generating, using the neural network, training network output data, receiving ground-truth (GT) data, computing error data based on a difference between the training network output data and the GT data, and modifying the neural network based on the error data.

In some embodiments, the training network output data includes one or more of training eye segmentation data, training glint detection data, and training cornea center data. In some embodiments, the GT data includes one or more of 2D pupil center GT data, eye segmentation GT data, and glint detection GT data. In some embodiments, the eye segmentation GT data includes a manually created segmentation of the eye into a plurality of training regions including one or more of a training background region, a training sclera region, a training pupil region, and a training iris region. In some embodiments, the glint detection GT data includes a manually created identification of glint locations.

In some embodiments, the error data includes one or more of a difference between the training 2D pupil center data and the 2D pupil center GT data, a difference between the training eye segmentation data and the eye segmentation GT data, a difference between the training glint detection data and the glint detection GT data, and an error based on the training cornea center data and one or more geometric constraints. In some embodiments, the method further includes computing the one or more geometric constraints based on one or more of emitter location data, camera intrinsic parameters, the glint detection data, and the cornea center data. In some embodiments, the emitter location data includes a plurality of emitter locations. In some embodiments, the plurality of training input images were captured by the camera.

In another aspect of the present invention, an optical device, such as an AR device, is provided. The optical device may include a camera, a plurality of infrared (IR) light-emitting diodes (LED) directed toward an eye of the user (when the device is worn), and a processor communicatively coupled to the camera and configured to perform operations including receiving, from the camera, an input image of the eye, providing the input image of the eye to the neural network, generating, using the neural network, network output data, and computing, based on the network output data, a gaze vector corresponding to the eye. The processor may be further configured to perform any of the operations described in reference to the method above.

Numerous benefits are achieved by way of the present disclosure over conventional techniques. First, estimates using the trained network work well in conjunction with the classical eye tracking pipeline. It has been demonstrated that estimates using the trained network can be plugged into the geometric eye tracking system to improve its overall robustness and accuracy. Second, results from the multi-stage eye tracking model described herein can drive other vital applications in AR/VR/MR. For example, cornea prediction can be used for foveated rendering, and eye segmentation is useful for rendering eyes in avatar based social suite apps. Third, although collecting continuous gaze target GT data for a large number of subjects can be both inaccurate and difficult, data collection herein is made significantly simpler by decoupling the training of intermediate predictions (pupil and cornea estimation) from the final 3D gaze vector estimation pipeline. Fourth, whereas errors in end-to-end deep networks can be hard to interpret, intermediate estimates made in each stage using the trained network help with interpretability. Other benefits of the present disclosure will be readily apparent to those skilled in the art.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Eye tracking for gaze estimation is a crucial component for current and future generations of head-mounted virtual and mixed reality devices. It enables the use of energy and band-width efficient rendering of content, drives multi-focal displays for more true to reality rendering of content, and acts as an effective and non-obtrusive manner of understanding user's needs. The process of estimating accurate gaze involves appearance based computations (segmentation, key point detection, e.g., pupil centers, glints) followed by model/geometry based computations (e.g., estimating cornea, pupil centers, and gaze vectors in three dimensions). Current eye trackers use classical computer vision techniques (without learning) to estimate the pupil boundary/center and then compute the gaze based on those estimates. Estimates using the trained network described herein are significantly more accurate than the classical techniques. According to the present invention, a single deep network is trained to jointly estimate multiple quantities relating to eye and gaze estimation for off-axis eye images.

Figure 1:
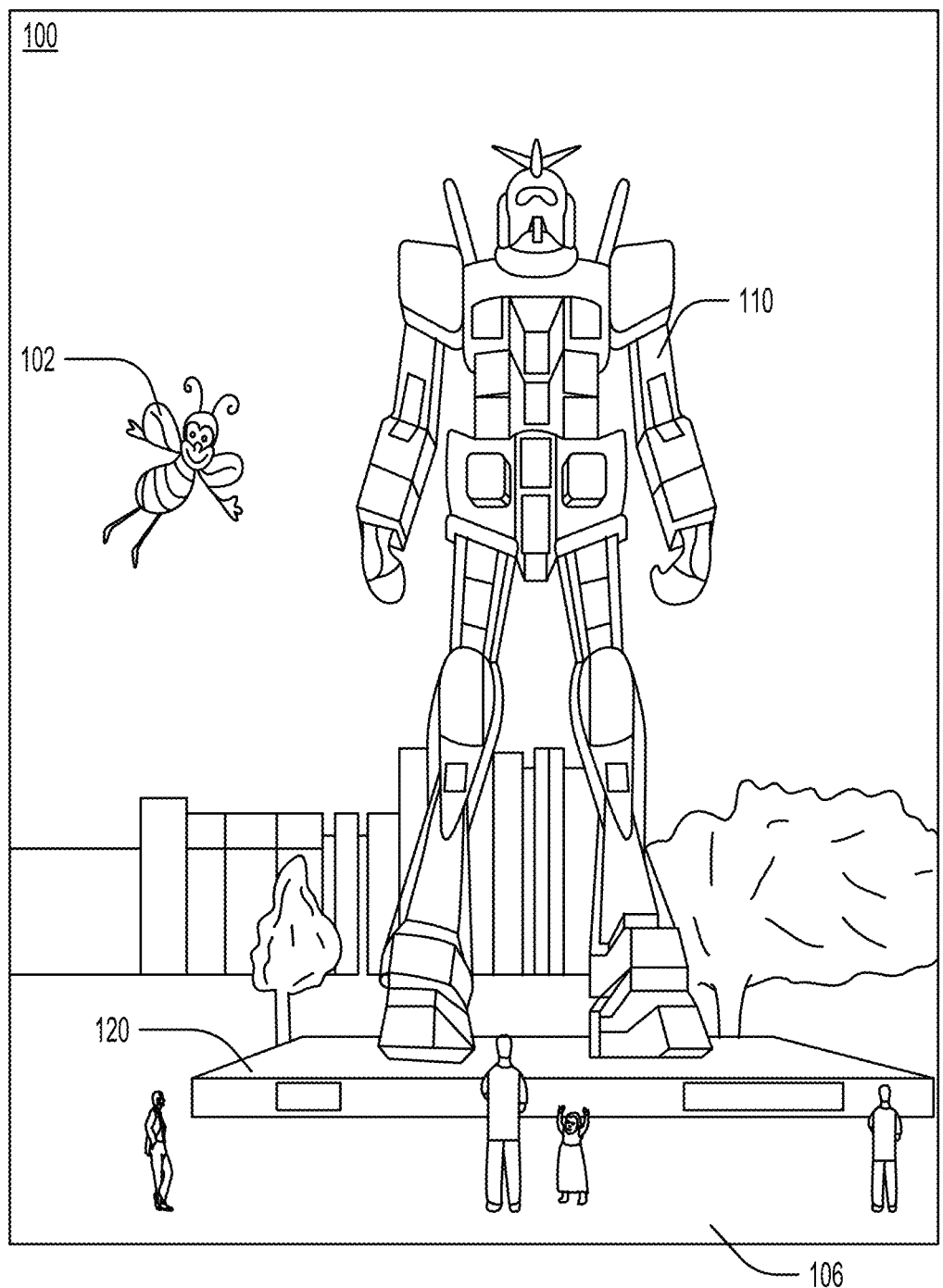
FIG. 1 illustrates an augmented reality (AR) scene as viewed through a wearable AR device according to an embodiment described herein.

FIG. 1 illustrates an augmented reality (AR) scene as viewed through a wearable AR device according to an embodiment described herein. An AR scene 100 is depicted wherein a user of an AR technology sees a real-world park-like setting 106 featuring people, trees, buildings in the background, and a concrete platform 120. In addition to these items, the user of the AR technology also perceives that he "sees" a robot statue 110 standing upon the real-world platform 120, and a cartoon-like avatar character 102 flying by, which seems to be a personification of a bumble bee, even though these elements (character 102 and statue 110) do not exist in the real world. Due to the extreme complexity of the human visual perception and nervous system, it is challenging to produce a virtual reality (VR) or AR technology that facilitates a comfortable, natural-feeling, rich presentation of virtual image elements amongst other virtual or real-world imagery elements.

Figure 2:
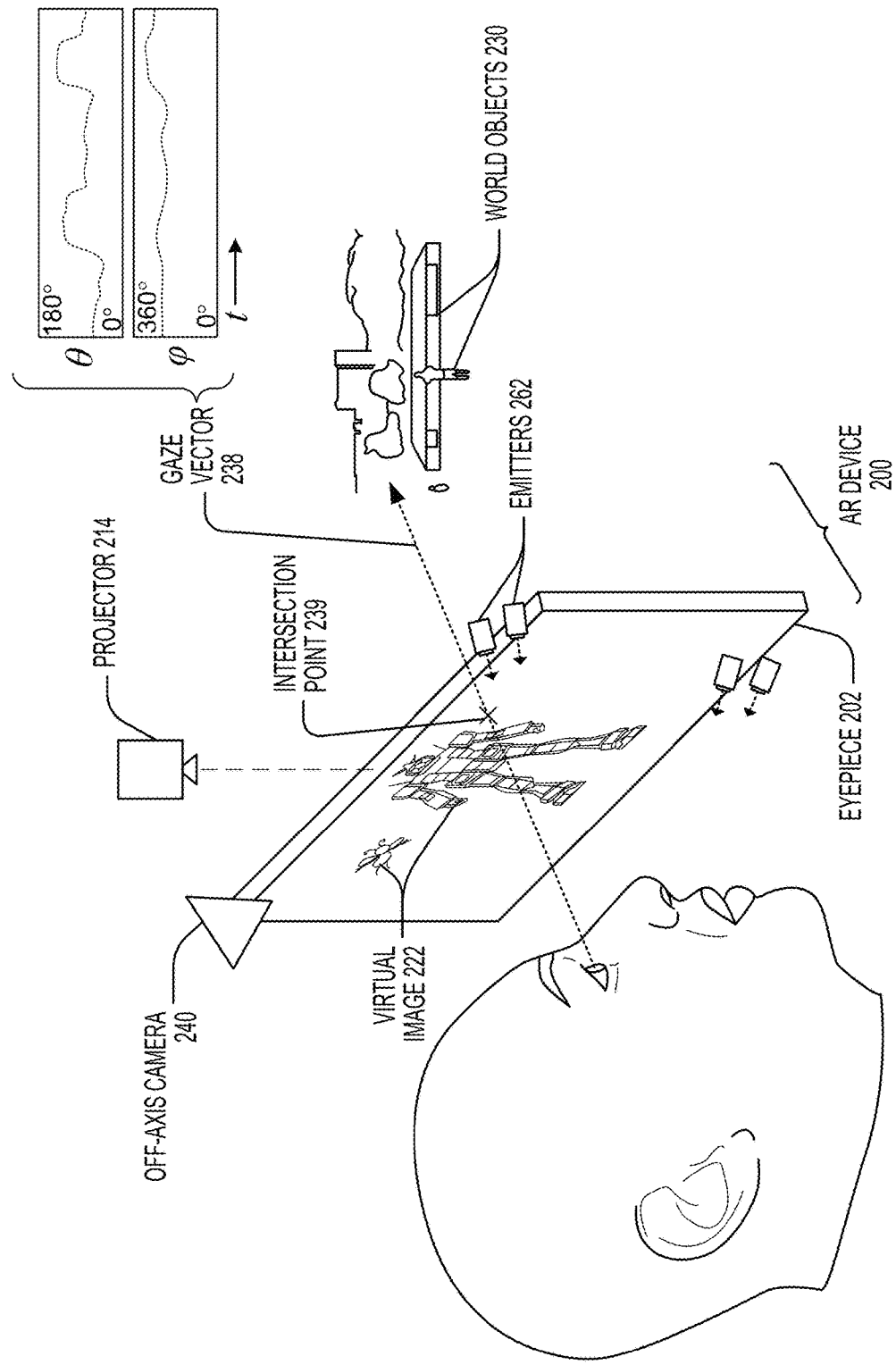
FIG. 2 illustrates various features of an AR device according to the present invention.

FIG. 2 illustrates various features of an AR device 200 according to the present invention. In some embodiments, AR device 200 may include a projector 214 configured to project light onto an eyepiece 202 such that a virtual image 222 is perceived by a user alongside world objects 230. AR device 200 may also include an off-axis camera 240 and one or more emitters 262 mounted to AR device 200 and directed toward an eye of the user. Emitters 262 may comprise infrared (IR) light-emitting diodes (LED) that transmit light that is invisible to the eye of the user but is detectable by off-axis camera 240. In some embodiments, emitters 262 may comprise LEDs that transmit light that is visible to the eye of the user such that off-axis camera 240 need not have the capability to detect light in the IR spectrum. As such, off-axis camera 240 may be a camera with or without IR detection capabilities.

During operation of AR device 200, off-axis camera 240 may detect information (e.g., capture images) leading to the estimation of a gaze vector 238 corresponding to the eye of the user. Gaze vector 238 may be computed for each image frame and may, in various embodiments, be expressed as a two-dimensional (2D) or three-dimensional (3D) value. For example, as illustrated in FIG. 2, gaze vector 238 may be expressed using a spherical coordinate system by a polar angle θ and an azimuthal angle φ. Alternatively or additionally, gaze vector 238 may be expressed using a 3D Cartesian coordinate system by X, Y, and Z values. Gaze vector 238 may intersect with eyepiece 202 at an intersection point 239 that may be calculated based on the location of the eye of the user, the location of eyepiece 202, and gaze vector 238. In some instances, projector 214 may adjust virtual image 222 to improve image brightness and/or clarity around intersection point 239 in favor of other areas of the field of view.

Figure 3:
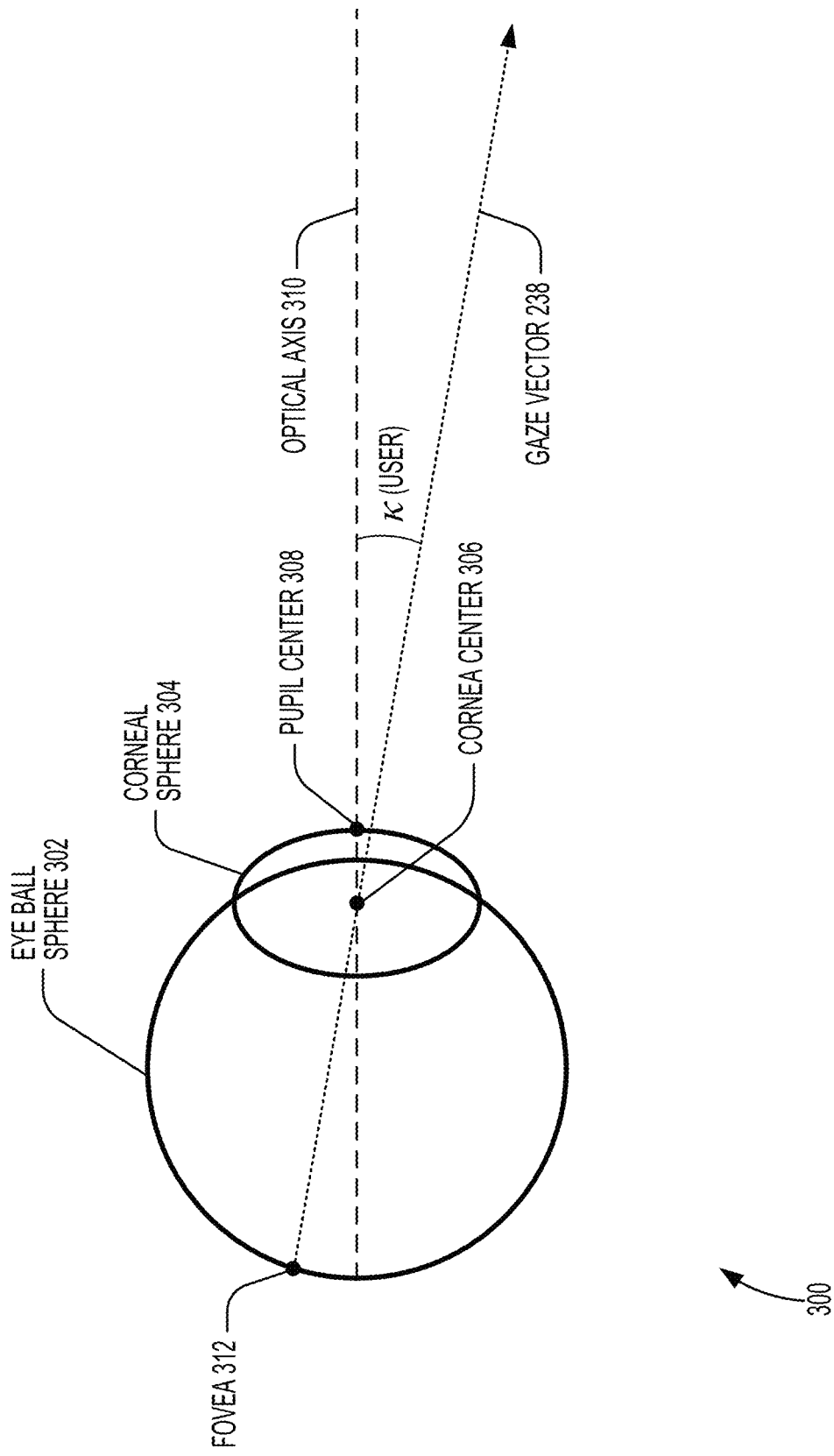
FIG. 3 illustrates a standard double spherical model of a human eye.

FIG. 3 illustrates a standard double spherical model 300 of the human eye. According to model 300, an eye ball sphere 302 may completely or partially encompass an inner corneal sphere 304. A cornea center 306 may be the geometric center of the corneal sphere 304. A pupil center 308 may correspond to the pupil opening or pupil center of the eye and may be encompassed by corneal sphere 304. An optical axis 310 of the eye may be a vector formed by connecting cornea center 306 and pupil center 308. Gaze vector 238 (alternatively referred to as the visual axis) may be formed by connecting cornea center 306 and a fovea 312 at the back of the eye. Because fovea 312 is generally unknown and difficult to estimate, gaze vector 238 may be computed using optical axis 310 and a user-specific calibration angle κ. Calibration angle κ may be a one-dimensional (1D), 2D, or 3D value and may be calibrated for a particular user during a calibration phase when AR device 200 is operated by that user for the first time. Once calibration angle κ is computed for a particular user, it is assumed to be fixed. Accordingly, estimating optical axis 310 using cornea center 306 and pupil center 308 is the key problem underlying gaze tracking.

Figure 4:
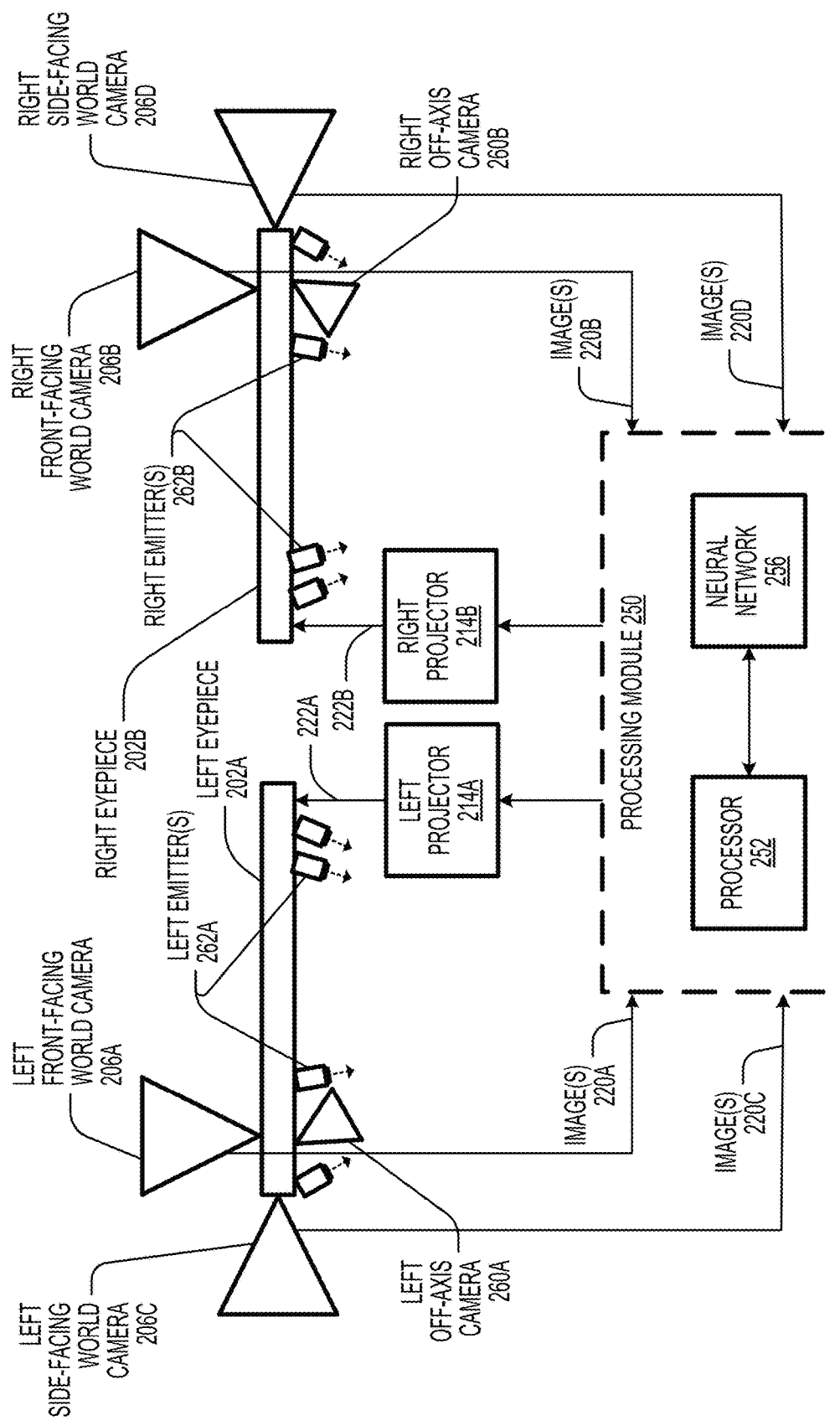
FIG. 4 illustrates a schematic view of an AR device according to the present invention.

FIG. 4 illustrates a schematic view of AR device 200 according to the present invention. AR device 200 may include a left eyepiece 202A, a right eyepiece 202B, a left front-facing world camera 206A attached directly on or near left eyepiece 202A, a right front-facing world camera 206B attached directly on or near right eyepiece 202B, a left side-facing world camera 206C, a right side-facing world camera 206D, and a processing module 250. Emitters 262 may be mounted to one or both of eyepieces 202 and may in some embodiments be separated into left emitters 262A mounted directly on or near left eyepiece 202A and right emitters 262B mounted directly on or near right eyepiece 202B (e.g., mounted to the frame of AR device 200). In some instances, AR device 200 may include a single or multiple off-axis cameras 260 such as a centrally positioned off-axis camera 260 or, as illustrated in FIG. 4, a left off-axis camera 260A mounted directly on or near left eyepiece 202A and a right off-axis camera 260A mounted directly on or near right eyepiece 202B.

Some or all of the components of AR device 200 may be head mounted such that projected images may be viewed by a user. In one particular implementation, all of the components of AR device 200 shown in FIG. 4 are mounted onto a single device (e.g., a single headset) wearable by a user. In another implementation, processing module 250 is physically separate from and communicatively coupled to the other components of AR device 200 by wired or wireless connectivity. For example, processing module 250 may be mounted in a variety of configurations, such as fixedly attached to a frame, fixedly attached to a helmet or hat worn by a user, embedded in headphones, or otherwise removably attached to a user (e.g., in a backpack-style configuration, in a belt-coupling style configuration, etc.).

Processing module 250 may comprise a processor 252 as well as digital memory, such as non-volatile memory (e.g., flash memory), both of which may be utilized to assist in the processing, caching, and storage of data. The data may include data captured from sensors (which may be, e.g., operatively coupled to AR device 200) such as image capture devices (e.g., cameras 206 and off-axis cameras 260), microphones, inertial measurement units, accelerometers, compasses, GPS units, radio devices, and/or gyros. For example, processing module 250 may receive image(s) 220 from cameras 206, or more specifically, left front image(s) 220A from left front-facing world camera 206A, right front image(s) 220B from right front-facing world camera 206B, left side image(s) 220C from left side-facing world camera 206C, and right side image(s) 220D from right side-facing world camera 206D. In some embodiments, image(s) 220 (or those received from off-axis cameras 260) may include a single image, a pair of images, a video comprising a stream of images, a video comprising a stream of paired images, and the like. Image(s) 220 (or those received from off-axis cameras 260) may be periodically generated and sent to processing module 250 while AR device 200 is powered on, or may be generated in response to an instruction sent by processing module 250 to one or more of the cameras.

Eyepieces 202A and 202B may comprise transparent or semi-transparent waveguides configured to direct light from projectors 214A and 214B, respectively. Specifically, processing module 250 may cause left projector 214A to output a left projected image 222A onto left eyepiece 202A, and may cause right projector 214B to output a right projected image 222B onto right eyepiece 202B. In some embodiments, each of eyepieces 202 may each comprise a plurality of waveguides corresponding to different colors and/or different depth planes.

Cameras 206A and 206B may be positioned to capture images that substantially overlap with the field of view of a user's left and right eyes, respectively. Accordingly, placement of cameras 206A and 206B may be near a user's eyes but not so near as to obscure the user's field of view. Alternatively or additionally, cameras 206A and 206B may be positioned so as to align with the incoupling locations of projected images 222A and 222B, respectively. Cameras 206C and 206D may be positioned to capture images to the side of a user, e.g., in a user's peripheral vision or outside the user's peripheral vision. Image(s) 220C and 220D captured using cameras 206C and 206D need not necessarily overlap with image(s) 220A and 220B captured using cameras 206A and 206B. Cameras 260A and 260B may be positioned to captures images of the user's left and right eyes, respectively. Images captured by cameras 260 may show the user's eyes in their entirety or some portion of the user's eyes.

During operation of AR device 200, processing module 250 may use a neural network 256 to estimate gaze vector 238. Neural network 256 may be an artificial neural network, a convolutional neural network, or any type of computing system that can "learn" progressively by processing examples. For example, neural network 256 may be trained by processing manually prepared training data that represents ground truth (GT) data. After processing each piece of the training data, neural network 256 is able to generate outputs that more closely approximate the GT data. In some embodiments, neural network 256 comprises a collection of connected nodes that are capable of transmitting signals from one to another. The training and usage of neural network 256 is described further below.

Figure 5:
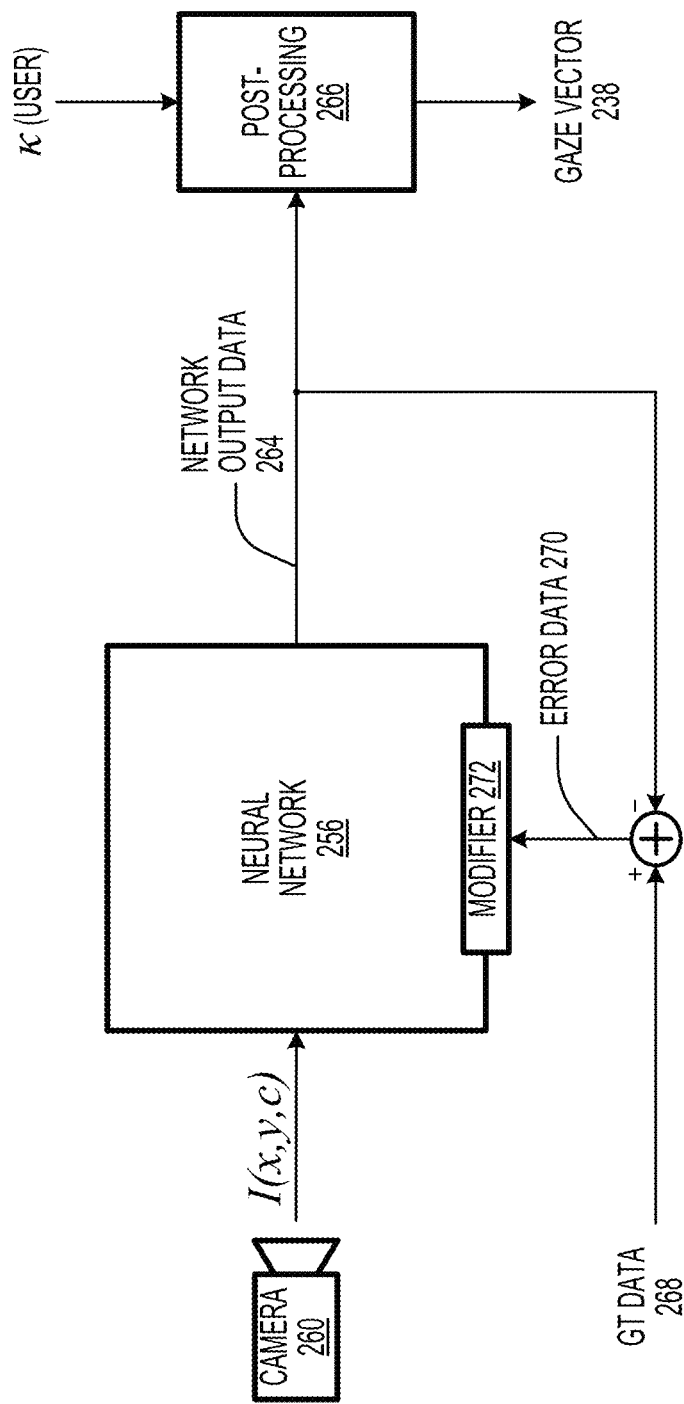
FIG. 5 illustrates a schematic view of a configuration of a network.

FIG. 5 illustrates a schematic view of a configuration of neural network 256. An input image I(x,y,c) captured by off-axis camera 260 may be provided as input to neural network 256. Input image I(x,y,c) may have dimensions of H×W×C where H is the number of pixels in the vertical direction, W is the number of pixels in the horizontal direction, and C is the number of channels of the image (e.g., equal to 3 for RGB images and 1 for grayscale images). Neural network 256 may process input image I(x,y,c) and may generate network output data 264 based on input image I(x,y,c). When AR device 200 is operating in a runtime mode, network output data 264 may be used in conjunction with calibration angle κ to compute gaze vector 238. In some embodiments, a post-processing block 266 may perform one or more operations to compute gaze vector 238. In other embodiments, or in the same embodiments, calibration angle κ may be provided as input to neural network 256 along with input image I(x,y,c), and gaze vector 238 may directly be included in network output data 264 or may be computed based on network output data 264.

When AR device 200 is operating in a training mode, network output data 264 may be compared to GT data 268. An error data 270 may be computed based on the comparison and may represent a difference between network output data 264 and GT data 268 such that, in some embodiments, a magnitude of error data 270 may be proportional to the difference between network output data 264 and GT data 268. Neural network 256 may be modified (e.g., using modifier 272) based on error data 270. In some embodiments, the magnitude of the modification to neural network 256 may be proportional to the magnitude of error data 270 such that larger differences between network output data 264 and GT data 268 may correspond to larger modifications to neural network 256.

Figure 6:
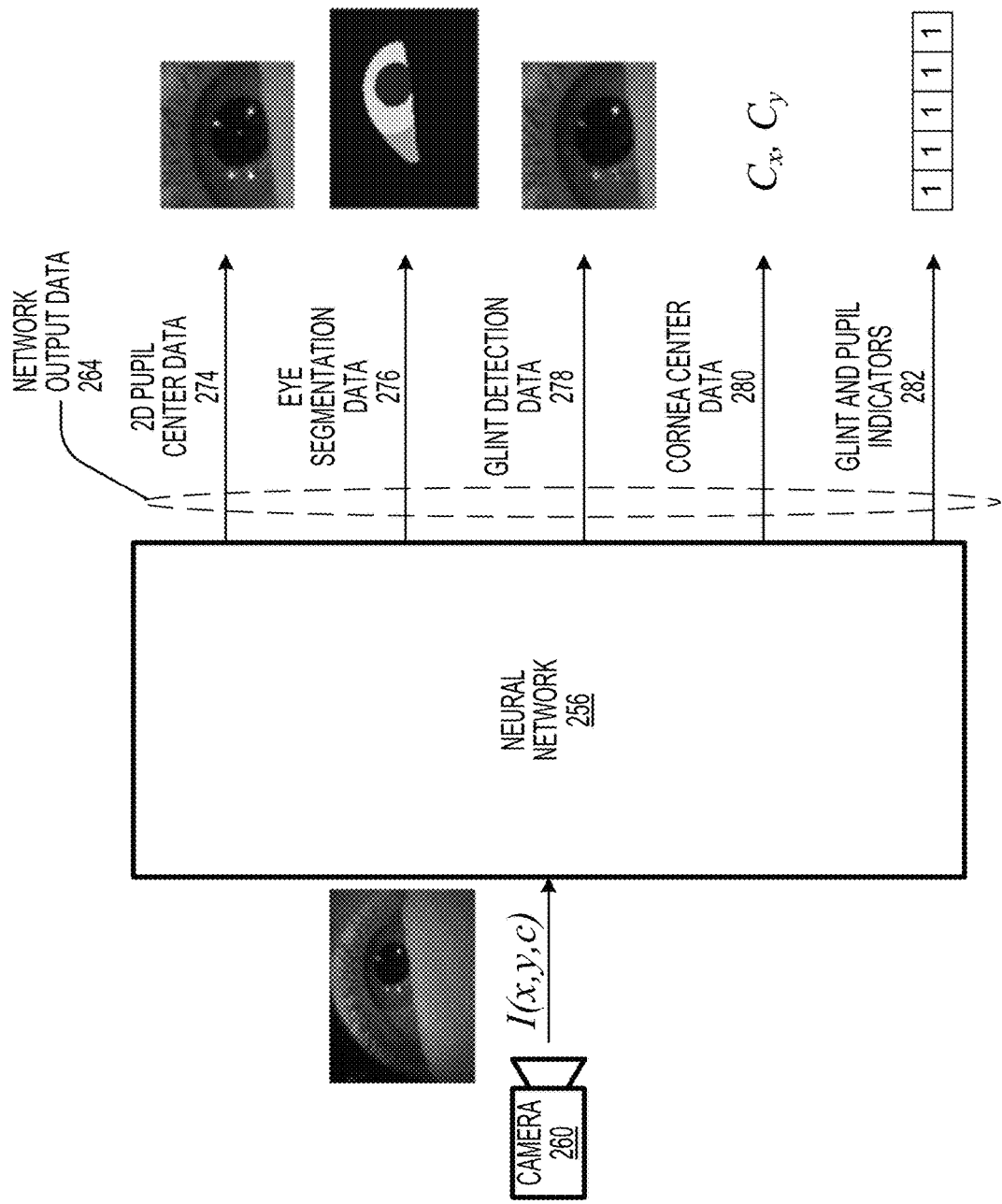
FIG. 6 illustrates a schematic view of various inputs and outputs of a network.

FIG. 6 illustrates a schematic view of various inputs and outputs of neural network 256. Network output data 264 may include one or more of the types of data shown in FIG. 6. Based on whether AR device is operating in training mode or runtime mode, one or more of the types of data may not be utilized in subsequent processing. Alternatively, based on whether AR device 200 is operating in training mode or runtime mode, one or more of the types of data may not be generated by neural network 256 to save processing power.

In some embodiments, network output data 264 may include 2D pupil center data 274. In some embodiments, 2D pupil center data 274 may include a 2D pupil center expressed as a 2D value. For example, the 2D pupil center may include an X and Y value within the frame of input image $I(x,y,c)$ corresponding to the computed location of the center of the pupil (e.g., pupil center 308). Alternatively or additionally, 2D pupil center data 274 may include a matrix having dimensions of H×W comprising binary values of 0 or 1 (values of 1 corresponding to the computed location of the center of the pupil).

In some embodiments, network output data 264 may include eye segmentation data 276. Eye segmentation data 276 may include a segmentation of the eye into a plurality of regions. In one particular implementation, the regions may include a background region, a sclera region, a pupil region, and an iris region. In another particular implementation, the regions may include a pupil region and a non-pupil region. In another particular implementation, the regions may include a pupil region, an eye region (including portions of the eye not part of the pupil region), and a background region. In some embodiments, eye segmentation data 276 may include a matrix having dimensions of H×W comprising a finite set of values, such as 0, 1, 2, and 3 (corresponding to, e.g., a background region, a sclera region, a pupil region, and an iris region, respectively). In some embodiments, eye segmentation data 276 includes an assignment of every pixel of input image $I(x,y,c)$ to a set of classes including background, sclera, pupil, and iris, which may, in some embodiments, be obtained by taking the last layer of (decoder) neural network 256 and upsampling it to the same resolution as input image $I(x,y,c)$ using deconvolution, which is in turn fed into a softmax cross-entropy loss across feature channels where each feature channel represents the probability of pixels belonging to a certain class.

In some embodiments, network output data 264 may include glint detection data 278. In some embodiments, glint detection data 278 includes one or more glint locations expressed as 2D or 3D values. For example, if only a single glint location is detected, glint detection data 278 may include a single 2D value, or if four glint locations are detected, glint detection data 278 may include four 2D values. In some embodiments, glint detection data 278 may include X and Y values within the frame of input image $I(x,y,c)$ corresponding to the computed locations of the detected glints. Alternatively or additionally, glint detection data 278 may include a matrix having dimensions of H×W comprising binary values of 0 or 1 (values of 1 corresponding to a location of a detected glint).

In some embodiments, network output data 264 may include cornea center data 280. In some embodiments, cornea center data 280 may include a 2D cornea center expressed as a 2D value or a 3D cornea center expressed as a 3D value. For example, the 2D cornea center may include an X and Y value within the frame of input image $I(x,y,c)$ corresponding to the computed location of the center of the cornea (e.g., cornea center 306). Alternatively or additionally, cornea center data 280 may include a matrix having dimensions of H×W comprising binary values of 0 or 1 (values of 1 corresponding to the computed location of the center of the cornea).

In some embodiments, network output data 264 may include glint and pupil indicators 282. In some embodiments, glint and pupil indicators 282 comprise binary values of 0 or 1 (values of 1 corresponding to successful detection of the glint(s) or the pupil center, values of 0 corresponding to unsuccessful detection). In an alternative embodiments, values of 1 may correspond to occlusion of the glint(s) or the pupil center. In one particular implementation, glint and pupil indicators 282 may comprise five binary values, the first four binary values corresponding to four glints and the last binary value corresponding to the pupil center. In some embodiments, glint and pupil indicators 282 may be alternatively generated based on 2D pupil center data 274 and glint detection data 278. In some embodiments, glint and pupil indicators 282 may be obtained by taking the last layer of the encoder (all features are shared in the common blocks), reshaping and adding two fully-connected layers to produce 5×2 probabilities as a binary classification of whether some of the four glints and one pupil center are missing.

Figure 7:
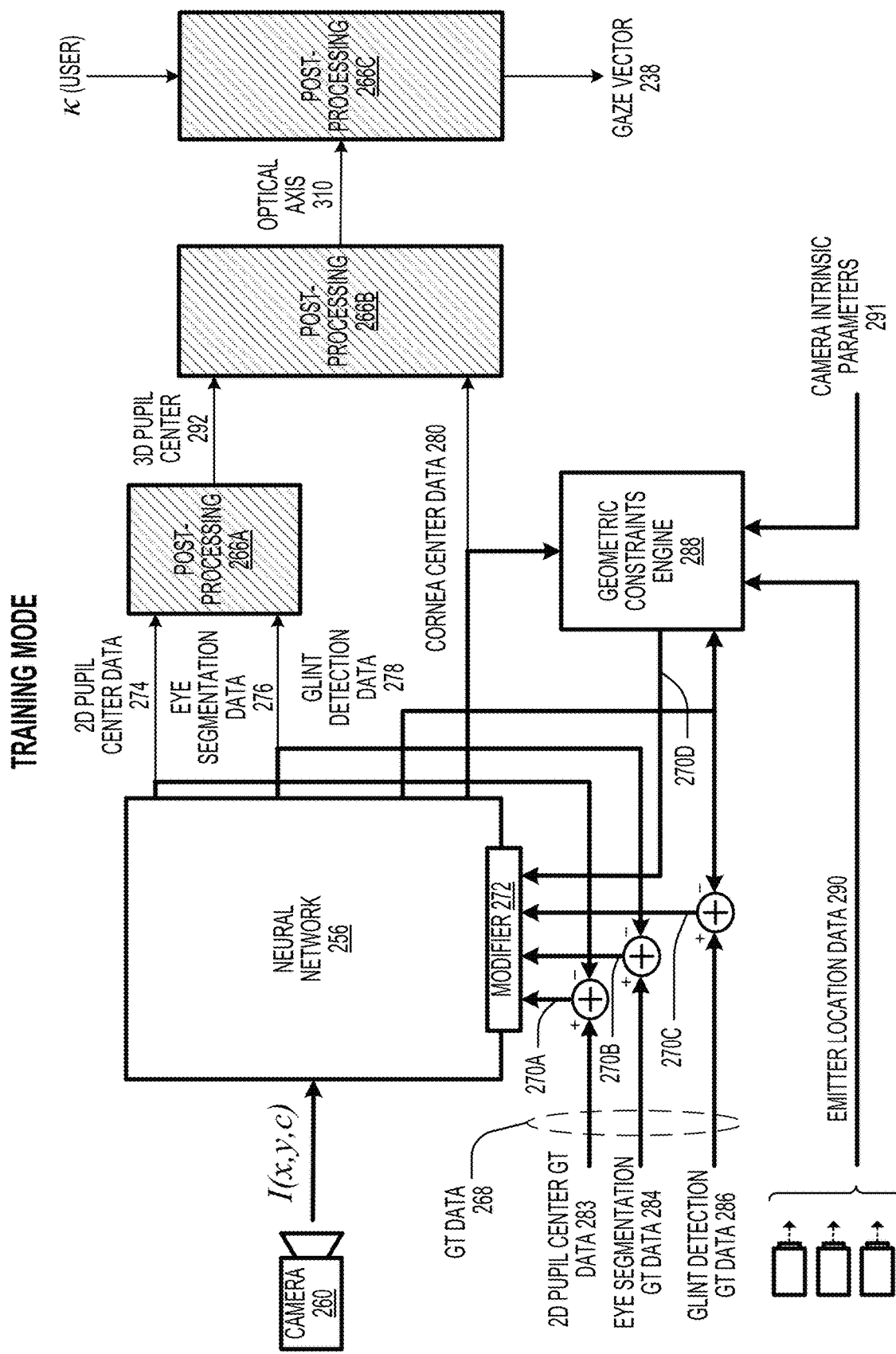
FIG. 7 illustrates a schematic view of an AR device operating in a training mode.
Figure 8:
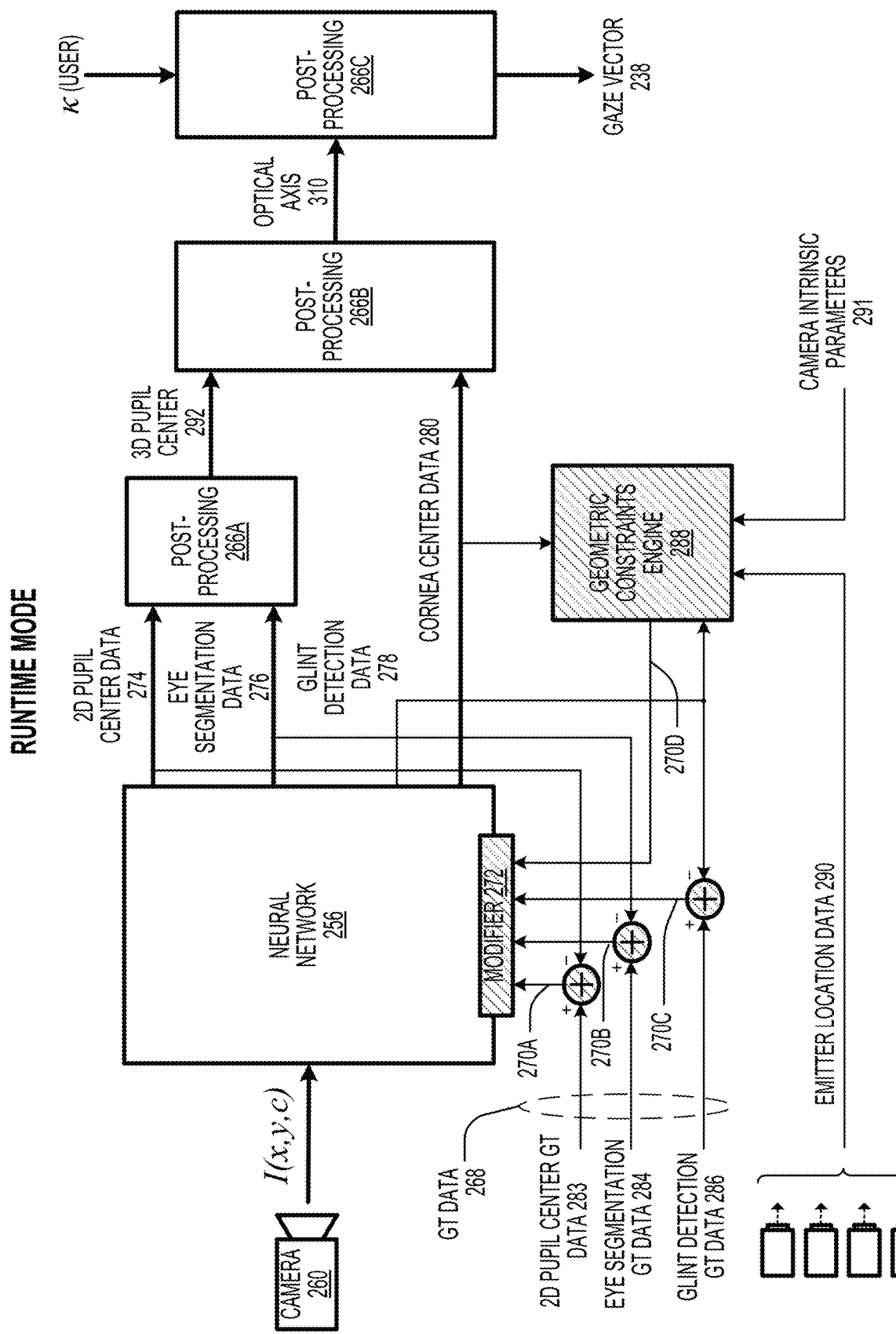
FIG. 8 illustrates a schematic view of an AR device operating in a runtime mode.

FIGS. 7 and 8 illustrate schematic views of AR device 200 operating in a training mode and a runtime mode, respectively. When AR device 200 is operating in training mode, network output data 264 includes eye segmentation data 276, glint detection data 278, and cornea center data 280. The particular input image $I(x,y,c)$ used to generate these network outputs may also manually examined by one or more individuals who may prepare GT data 268 prior to, subsequent to, or concurrently with generation of network output data 264 by neural network 256. For example, an individual may examine a displayed version of input image $I(x,y,c)$ on an electronic device such as a personal computer or a smart phone. A program or application on the electronic device may ask the individual a set of questions related to input image $I(x,y,c)$ and the individual may input his/her responses using an input device such as a mouse, keyboard, touchscreen, etc.

While observing and examining input image $I(x,y,c)$, the individual may prepare 2D pupil center GT data 283 by identifying, using an input device, the contours of the pupil. This may include the individual placing an ellipse boundary over the pupil and causing the pupil center to be automatically calculated based on the placed ellipse boundary. 2D pupil center GT data 283 may be prepared so as to have the same formatting and dimensions as 2D pupil center data 274 (e.g., an X and Y value). Additionally, while observing and examining input image $I(x,y,c)$, the individual may prepare eye segmentation GT data 284 by deciding that a first region of the image should be assigned as the background region, a second region as the sclera region, a third region as the pupil region, and a fourth region as the iris region. Eye segmentation GT data 284 may be prepared so as to have the same formatting and dimensions as eye segmentation data 276 (e.g., a matrix having dimensions of H×W comprising a finite set of values, such as 0, 1, 2, and 3 corresponding to the different regions).

Additionally, while observing and examining input image I(x,y,c), the individual may prepare glint detection GT data 286 by deciding how many glint locations are present in input image I(x,y,c) and the locations of each. Glint detection GT data 286 may be prepared so as to have the same formatting and dimensions as glint detection data 278 (e.g., a set of 2D values), or if some number of glint locations are detected (e.g., four), glint detection GT data 286 may include that number of 2D values. In some embodiments, glint detection GT data 286 may include X and Y values within the frame of input image I(x,y,c) corresponding to the computed locations of the detected glints. Alternatively or additionally, glint detection GT data 286 may include a matrix having dimensions of H×W comprising binary values of 0 or 1 (values of 1 corresponding to a location of a detected glint).

In one particular implementation, GT data 268 may be obtained by having an individual or a group of individuals face a 3×3 grid of points at two distinct depths, a near depth at, e.g., 3 meters and a farther plane at, e.g., 6 meters. On a given cue, an individual is asked to focus their gaze on one of these 18 3D points, which allow GT data 268 for gaze vector 238 to be collected for each frame (to later determine overall accuracy). Images captured of the individual's eye (using a camera of an AR device worn by the individual) may be analyzed to allow GT data 268 to include eye segmentation and glint location information. Because there is diminishing returns in annotating segmentation, glints, and pupil centers for every frame at 30 or 60 Hz recordings, some number (e.g., 200) of left or right eye image frames may be uniformly sampled for each individual to manually annotate segmentation, glint presence or absence, glint 2D and pupil 2D positions. In one particular experimental run, 87,000 annotated images were used in a dataset to train and validate performance of neural network 256.

In some embodiments, error data 270 may include a first error data 270A computed based on the difference between 2D pupil center data 274 and 2D pupil center GT data, a second error data 270B computed based on the difference between eye segmentation data 276 and eye segmentation GT data 284, a third error data 270C based on the difference between glint detection data 278 and glint detection GT data 286, and a fourth error data 270C generated by a geometric constraints engine 288. Inputs to geometric constraints engine 288 include one or more of cornea center data 280, glint detection data 278, emitter location data 290, and camera intrinsic parameters 291. Emitter location data 290 may include the fixed locations of emitters 262 and/or the emitting directions of emitters 262. Emitter location data 290 may be determined upon manufacture of AR device 200 and/or during a calibration phase. Camera intrinsic parameters 291 may include the optical center and/or the focal length of off-axis camera 260, among other possibilities. Camera intrinsic parameters 291 may be determined upon manufacture of off-axis camera 260 and/or during a calibration phase.

Geometric constraints engine 288 may perform various operations to evaluate the consistency between different generated data (glint detection data 278 and cornea center data 280) and calibrated data (emitter location data 290), and the output of geometric constraints engine 288, fourth error data 270D, may be inversely related to a likelihood or consistency parameter. In some instances, corneal sphere 304 is reconstructed using glint detection data 278 and emitter location data 290, and fourth error data 270D is set to a calculated distance between the center of the reconstructed sphere and the cornea center as indicated by cornea center data 280.

In some embodiments, the training of neural network 256 is improved by training sequentially using only certain outputs of neural network 256 during different training iterations. In a first training step, only eye segmentation data 276 is used to train neural network 256. This may be accomplished by modifying neural network 256 only using second error data 270B. Once neural network 256 is sufficiently trained (i.e., sufficiently accurate) for eye segmentation, a second training step is performed by additionally using glint detection data 278 to train neural network 256. This may be accomplished by modifying neural network 256 only using second error data 270B and third error data 270C. Once neural network 256 is sufficiently trained for eye segmentation and glint detection, a third training step is performed by additionally using cornea center data 280 to train neural network 256. This may be accomplished by modifying neural network 256 using all of error data 270. In some instances, the same training images and GT data may be used during different training steps. In some embodiments, AR device 200 remains in training mode until an accuracy threshold is met or a maximum iteration threshold is met (i.e., the number of training images used meets a maximum iteration threshold).

When AR device 200 is operating in runtime mode, network output data 264 includes 2D pupil center data 274, eye segmentation data 276, and cornea center data 280. These outputs may be used in conjunction with calibration angle κ to compute gaze vector 238 using post-processing block 266. In some embodiments, post-processing block 266 may be separated into a first post-processing block 266A, a second post-processing block 266B, and a third post-processing block 266C. First post-processing block 266A receives 2D pupil center data 274 and eye segmentation data 276 as inputs and computes 3D pupil center 292. Second post-processing block 266B receives 3D pupil center 292 and cornea center data 280 as inputs and computes optical axis 310. Third post-processing block 266C receives optical axis 310 and calibration angle κ as inputs and computes gaze vector 238.

Figure 9:
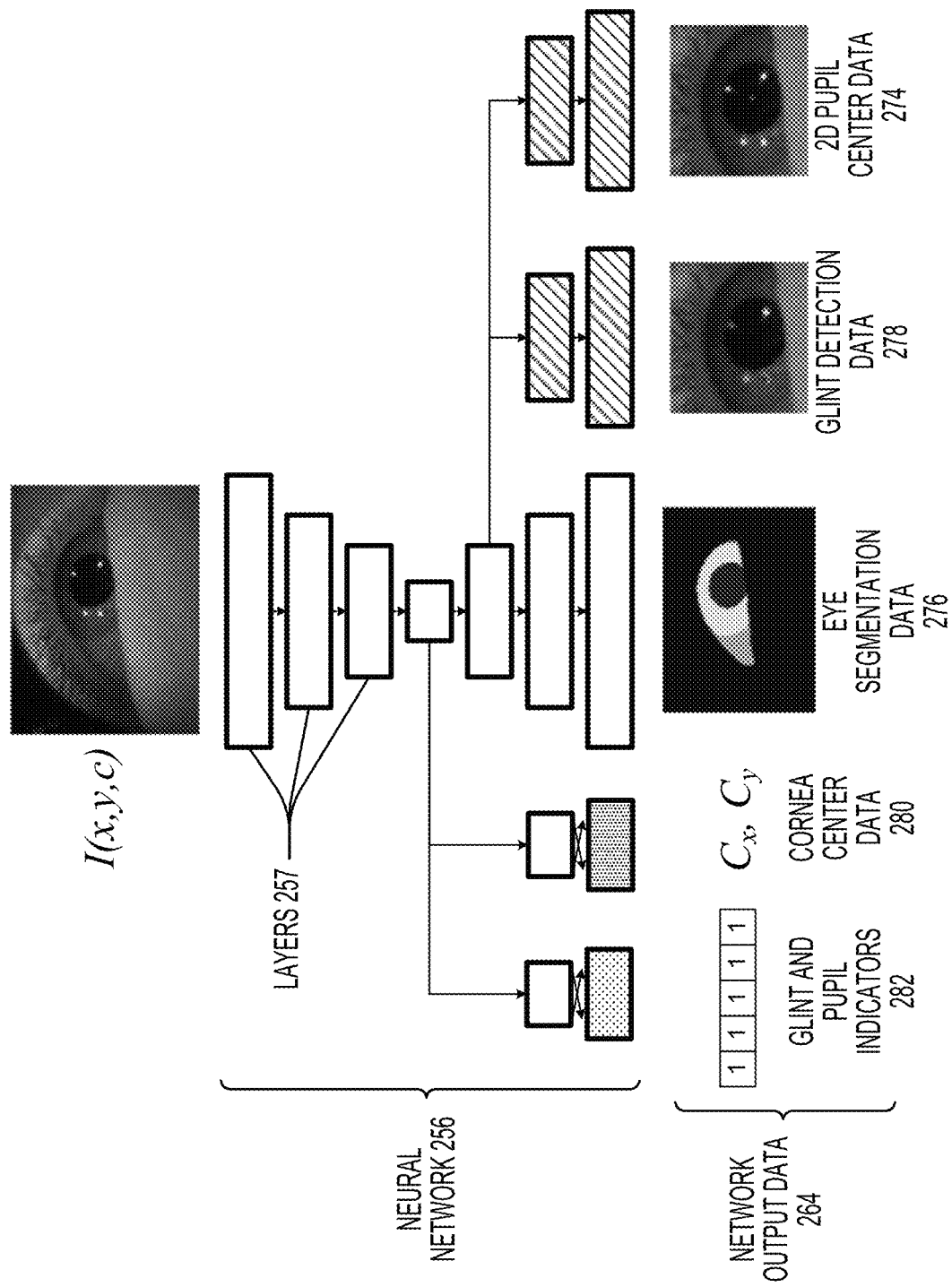
FIG. 9 illustrates one possible structure of a network.

FIG. 9 illustrates one possible structure of neural network 256 comprising a plurality of layers 257. Each of layers 257 may represent one or more operations that are performed on input image I(x,y,c). In some embodiments, neural network 256 may consist of a feature encoding base network and five task branches. As illustrated, some outputs of neural network 256 may be obtained at earlier stages and with fewer performed operations than other outputs of neural network 256. For example, glint and pupil indicators 282 and cornea center data 280 may be obtained with fewer computations than the other outputs, and eye segmentation data 276 is obtained with more computations than the other outputs. Accordingly, an advantage of training neural network 256 using eye segmentation data 276 first is that some layers that are only used for computation of eye segmentation data 276 can be fine-tuned without being affected by feedback from the other outputs.

Figure 10:
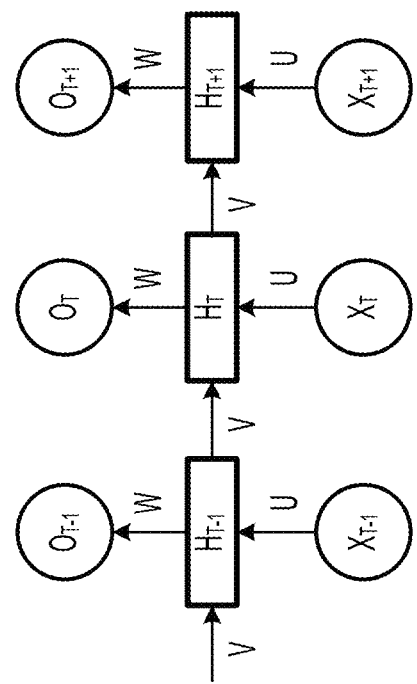
FIG. 10 illustrates a recurrent neural network (RNN) that produces blink predictions.
Figure 10:
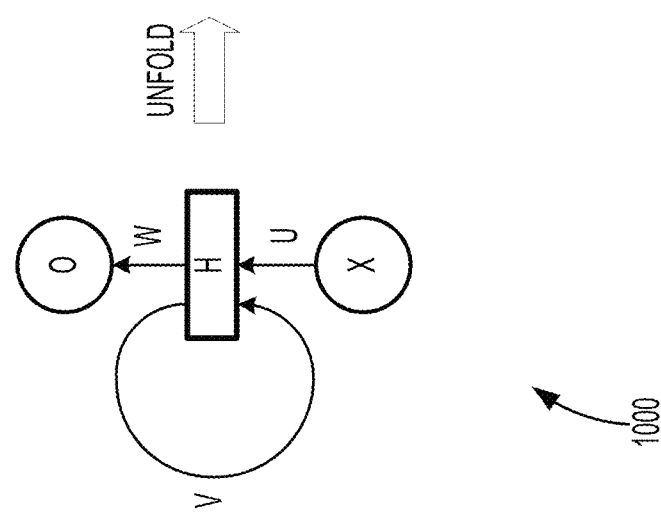

FIG. 10 illustrates a recurrent neural network (RNN) 1000 that takes features from neural network 256 and produces blink predictions. More specifically, RNN 1000 takes features (e.g., outputs) from neural network 256 for several consecutive frames (neural network 256 may produce features for each frame) and predicts whether a blink would occur (probability) in the next 1, 2, and/or 3 frames based on the motion and flow of the features. In some embodiments, RNN 1000 only takes features from consecutive frames outputted by neural network 256 instead of input images I(x,y,c) themselves. RNN 1000 has the advantages of predicting time-series or sequences of data (motions, tracking, etc). RNN 1000 may have an internal memory state with outputs, unlike convolutional neural networks (CNN), that feed back into itself to form a cycle in order to process sequence input data. In this manner, RNN 1000 "remembers" the history of events that occurred in the sequence so it can better predict the next outcome. In the particular implementation shown, $X_{t-1}$, $X_t$, and $X_{t+1}$ correspond to features for consecutive frames from neural network 256 and $O_{t-1}$, $O_t$, and $O_{t+1}$ are the probabilities of whether there will be a blink event in the next frame. Since RNN 1000 utilizes the high level features produced by neural network 256, it can be considered as an additional post-processing step that may be included to improve performance of AR device 200.

Figure 11:
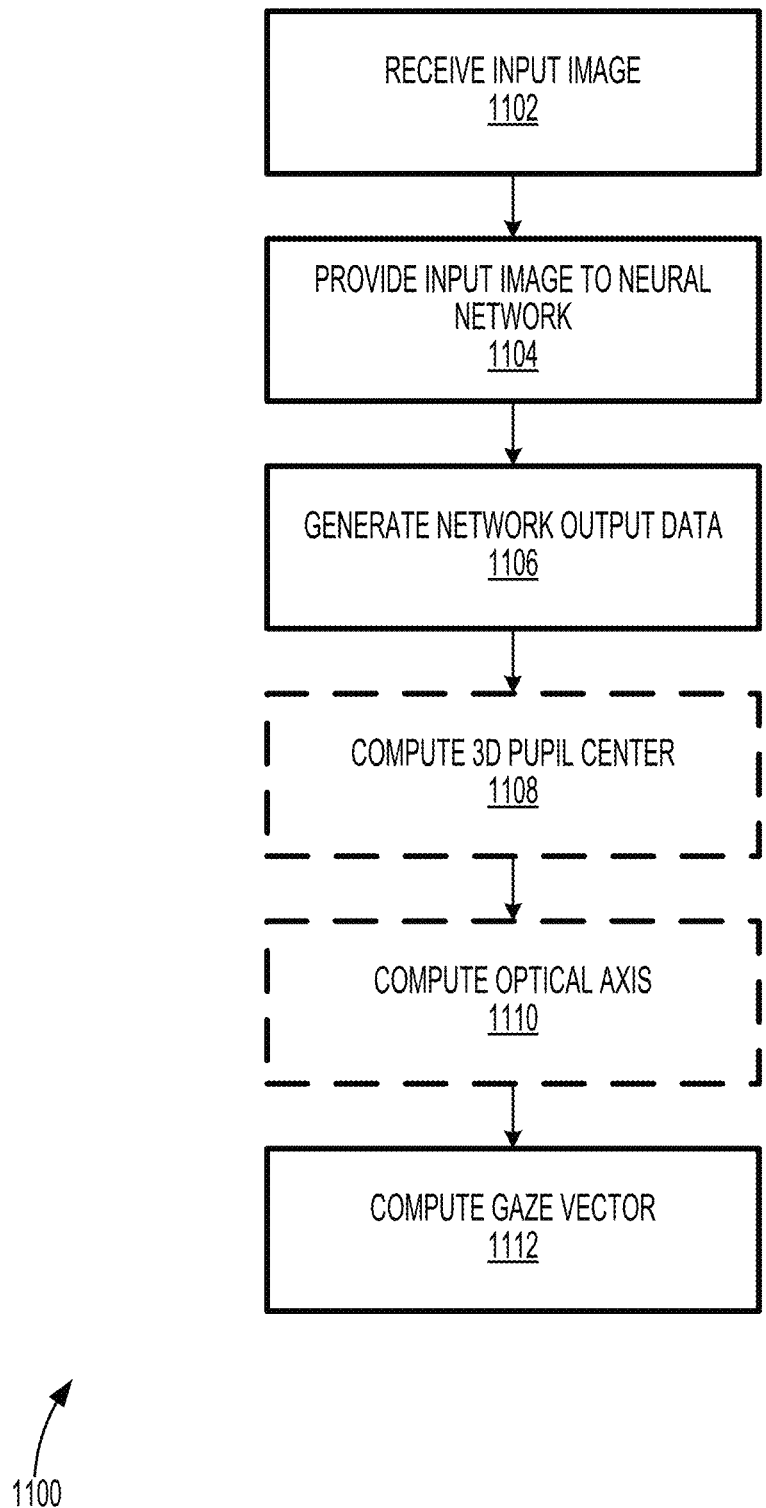
FIG. 11 illustrates a method of estimating a gaze vector using a network.

FIG. 11 illustrates a method 1100 of estimating a gaze vector using a neural network. Steps of method 1100 need not be performed in the order shown, and one or more steps of method 1100 may be omitted during performance of method 1100. In some embodiments, one or more steps of method 1100 may be performed by processing module 250 or some other component of AR device 200.

At step 1102, an input image (e.g., input image I(x,y,c)) of an eye of a user is received. In some embodiments, the input image is received from a camera (e.g., off-axis camera 260). The camera may be mounted to an optical device and/or may be a component of the optical device. In some embodiments, method 1100 includes the step of capturing, using the camera, the input image of the eye of the user. In some embodiments, method 1100 includes the step of sending the input image from the camera to a processing module (e.g., processing module 250).

At step 1104, the input image of the eye is provided to a neural network (e.g., neural network 256). In some embodiments, the input image is provided to a processor that implements the neural network. The processor may be a special-purpose processor (e.g., a neural network processor) having an architecture that allows certain operations that are commonly performed by neural networks (e.g., convolutions, matrix multiplications) to be performed faster than with a general-purpose processor. For example, the special-purpose processor may include a systolic array having multiple processing elements for performing various arithmetic operations concurrently or simultaneously on different pixels of the input image.

At step 1106, network output data (e.g., network output data 264) is generated using the neural network. The network output data may include data corresponding to an overall output of the neural network, as well as outputs of intermediary layers of the neural network. For example, the network output data may include certain data (e.g., eye segmentation data 276) that is derived from the overall output of the neural network and certain data (e.g., glint and pupil indicators 282 and cornea center data 280) that is derived from the output of an intermediary layer of the neural network. Additionally or alternatively, the network output data may include certain data (e.g., glint detection data 278 and 2D pupil center data 274) that is derived from the output of a different intermediary layer of the neural network as well as one or more additional layers that are not involved in the processing of the overall output of the neural network.

At step 1108, a 3D pupil center (e.g., 3D pupil center 292) is computed based on the network output data. In some embodiments, the 3D pupil center is computed based on the 2D pupil data and the eye segmentation data.

At step 1110, an optical axis (e.g., optical axis 310) associated with the eye of the user is computed based on the network output data. In some embodiments, the optical axis is computed based on the 3D pupil center and certain data (e.g., cornea center data 280) of the network output data.

At step 1112, a gaze vector (e.g., gaze vector 238) corresponding to the eye is computed based on the network output data. In some embodiments, the gaze vector is computed only using certain components of the network output data (e.g., 2D pupil center data 274, eye segmentation data 276, and cornea center data 280) while other components of the network output data (e.g., glint detection data 278) are not used in the computation. In some embodiments, computing the gaze vector may include one or more post-processing steps. For example, a 3D pupil center (e.g., 3D pupil center 292) may first be computed based on one or more components of the network output data (e.g., 2D pupil center data 274 and eye segmentation data 276). Second, an optical axis (e.g., optical axis 310) may be computed based on the 3D pupil center and an additional component of the network output data (e.g., cornea center data 280). Next, the gaze vector may be computed based on the optical axis and a calibration angle corresponding to a user.

Figure 12:
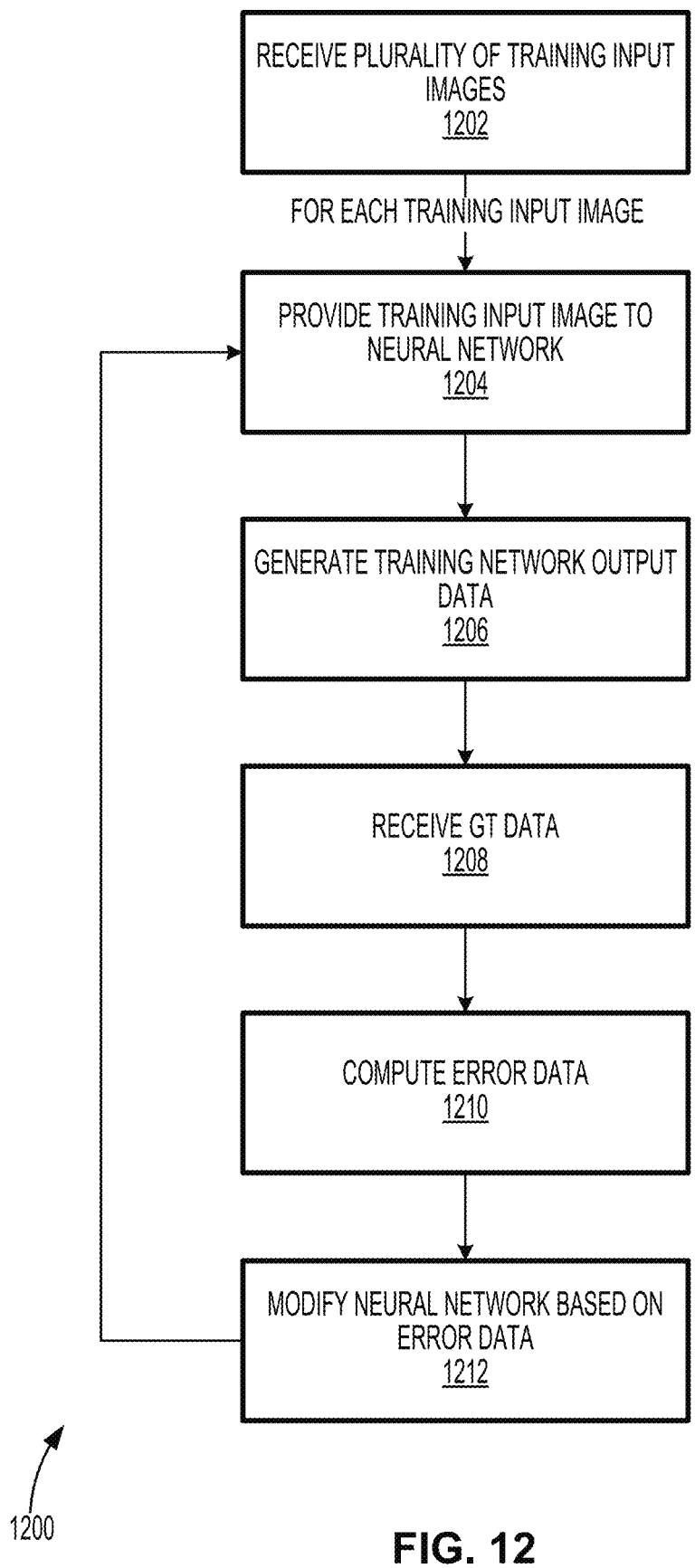
FIG. 12 illustrates a method of training a network for estimating a gaze vector.

FIG. 12 illustrates a method 1200 of training a neural network. Steps of method 1200 need not be performed in the order shown, and one or more steps of method 1200 may be omitted during performance of method 1200. In some embodiments, one or more steps of method 1200 may be performed by processing module 250 or some other component of AR device 200.

At step 1202, a plurality of training input images (e.g., input image I(x,y,c)) are received. The plurality of training input images may be received from a camera (e.g., off-axis camera 260) or may be artificially generated or retrieved for purposes of training. Each of the plurality of training images may be images of eyes. Step 1202 may be similar to step 1102.

Steps 1204 to 1212 may be performed for each training input image of the plurality of training input images. At step 1204, the training input image is provided to a neural network (e.g., neural network 256). Step 1204 may be similar to step 1104.

At step 1206, training network output data (e.g., network output data 264) is generated using the neural network. Step 1206 may be similar to step 1106.

At step 1208, GT data is received (e.g., GT data 268) from a user input device. The GT data may include one or more components (e.g., 2D pupil center GT data 283, eye segmentation GT data 284, glint detection GT data 286) that correspond to one or more components of the training network output data.

At step 1210, error data (e.g., error data 270) is computed based on a difference between the training network output data and the GT data. The error data may include one or more components (e.g., first error data 270A, second error data 270B, third error data 270C, fourth error data 270D) that correspond to one or more components of the GT data and/or the training network output data.

At step 1212, the neural network is modified based on the error data. In some embodiments, the magnitude of the modification to the neural network is proportional to the magnitude of the error data, such that larger differences between the training network output data and the GT data may correspond to larger modifications to the neural network. In some embodiments, the neural network may be trained using a backpropagation algorithm that calculates one or more weight updates to the weights of the neural network.

Figure 13:
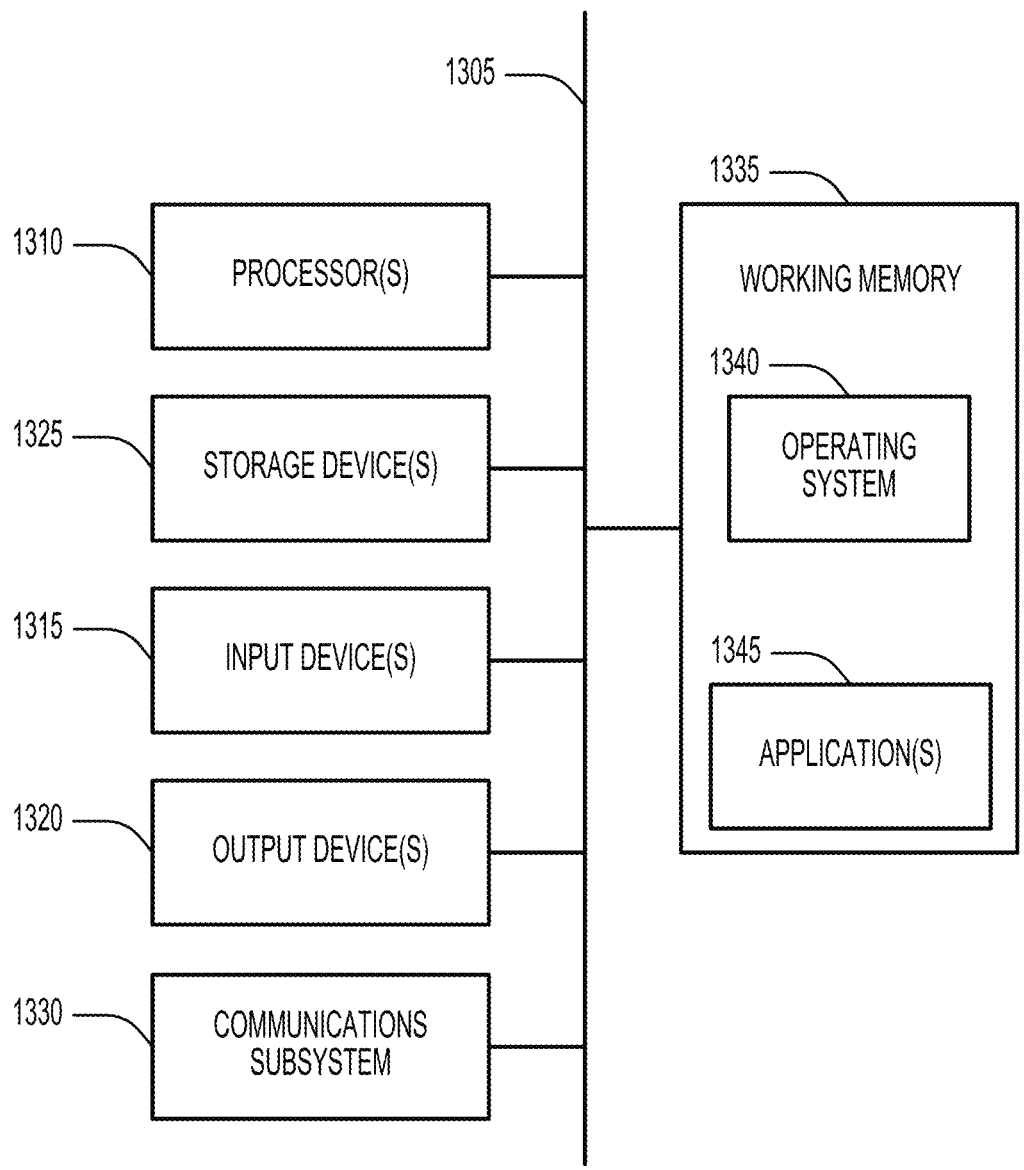
FIG. 13 illustrates a simplified computer system according to an embodiment described herein.

FIG. 13 illustrates a simplified computer system 1300 according to an embodiment described herein. Computer system 1300 as illustrated in FIG. 13 may be incorporated into devices such as AR device 200 as described herein. FIG. 13 provides a schematic illustration of one embodiment of computer system 1300 that can perform some or all of the steps of the methods provided by various embodiments. It should be noted that FIG. 13 is meant only to provide a generalized illustration of various components, any or all of which may be utilized as appropriate. FIG. 13, therefore, broadly illustrates how individual system elements may be implemented in a relatively separated or relatively more integrated manner.

Computer system 1300 is shown comprising hardware elements that can be electrically coupled via a bus 1305, or may otherwise be in communication, as appropriate. The hardware elements may include one or more processors 1310, including without limitation one or more general-purpose processors and/or one or more special-purpose processors such as digital signal processing chips, graphics acceleration processors, and/or the like; one or more input devices 1315, which can include without limitation a mouse, a keyboard, a camera, and/or the like; and one or more output devices 1320, which can include without limitation a display device, a printer, and/or the like.

Computer system 1300 may further include and/or be in communication with one or more non-transitory storage devices 1325, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

Computer system 1300 might also include a communications subsystem 1330, which can include without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 1330 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 1330. In other embodiments, a portable electronic device, e.g. the first electronic device, may be incorporated into computer system 1300, e.g., an electronic device as an input device 1315. In some embodiments, computer system 1300 will further comprise a working memory 1335, which can include a RAM or ROM device, as described above.

Computer system 1300 also can include software elements, shown as being currently located within the working memory 1335, including an operating system 1340, device drivers, executable libraries, and/or other code, such as one or more application programs 1345, which may comprise computer programs provided by various embodiments, and/or may be designed to implement methods, and/or configure systems, provided by other embodiments, as described herein. Merely by way of example, one or more procedures described with respect to the methods discussed above, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 1325 described above. In some cases, the storage medium might be incorporated within a computer system, such as computer system 1300. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by computer system 1300 and/or might take the form of source and/or installable code, which, upon compilation and/or installation on computer system 1300 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as computer system 1300 to perform methods in accordance with various embodiments of the technology. According to a set of embodiments, some or all of the procedures of such methods are performed by computer system 1300 in response to processor 1310 executing one or more sequences of one or more instructions, which might be incorporated into the operating system 1340 and/or other code, such as an application program 1345, contained in the working memory 1335. Such instructions may be read into the working memory 1335 from another computer-readable medium, such as one or more of the storage device(s) 1325. Merely by way of example, execution of the sequences of instructions contained in the working memory 1335 might cause the processor(s) 1310 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using computer system 1300, various computer-readable media might be involved in providing instructions/ code to processor(s) 1310 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 1325. Volatile media include, without limitation, dynamic memory, such as the working memory 1335.

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1310 for execution. Merely by way of example, the instructions may initially be carried on a magnetic disk and/or optical disc of a remote computer. A remote computer might load the instructions into its dynamic memory and send the instructions as signals over a transmission medium to be received and/or executed by computer system 1300.

The communications subsystem 1330 and/or components thereof generally will receive signals, and the bus 1305 then might carry the signals and/or the data, instructions, etc. carried by the signals to the working memory 1335, from which the processor(s) 1310 retrieves and executes the instructions. The instructions received by the working memory 1335 may optionally be stored on a non-transitory storage device 1325 either before or after execution by the processor(s) 1310.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of estimating a gaze vector for a user of an optical device, the method comprising:
   receiving, from a camera mounted to the optical device, an input image of an eye of the user;
   providing the input image of the eye of the user to a neural network having a plurality of layers, the neural network having been previously trained using a plurality of training input images;
   generating, using the neural network, network output data that includes two-dimensional (2D) pupil data and cornea center data, wherein a first subset of the plurality of layers are used to generate the 2D pupil data and a second subset of the plurality of layers are used to generate the cornea center data, wherein the first subset and the second subset share at least one common layer, and wherein each of the first subset and the second subset includes at least one unique layer; and
   computing, based on the network output data, the gaze vector corresponding to the eye of the user.

2. The method of claim 1, wherein the network output data further includes:
   eye segmentation data.

3. The method of claim 1, wherein the 2D pupil data includes a 2D pupil center.

4. The method of claim 2, wherein the eye segmentation data includes a segmentation of the eye of the user into a plurality of regions including one or more of a background region, a sclera region, a pupil region, or an iris region.

5. The method of claim 1, wherein the cornea center data includes a 2D or 3D cornea center.

6. The method of claim 2, further comprising:
computing, based on the 2D pupil data and the eye segmentation data, a three-dimensional (3D) pupil center.

7. The method of claim 6, further comprising:
computing, based on the 3D pupil center and the cornea center data, an optical axis associated with the eye of the user.

8. The method of claim 7, further comprising:
computing, based on the optical axis and a calibration angle corresponding to a user, a gaze vector associated with the eye of the user.

9. The method of claim 1, wherein the neural network was previously trained by:
for each training input image of the plurality of training input images:
providing the training input image to the neural network;
generating, using the neural network, training network output data;
receiving ground-truth (GT) data;
computing error data based on a difference between the training network output data and the GT data; and
modifying the neural network based on the error data.

10. The method of claim 9, wherein the training network output data includes one or more of:
training 2D pupil center data;
training eye segmentation data;
training glint detection data; or
training cornea center data.

11. The method of claim 10, wherein the GT data includes one or more of:
2D pupil center GT data;
eye segmentation GT data; or
glint detection GT data.

12. The method of claim 11, wherein the eye segmentation GT data includes a manually created segmentation of the eye of the user into a plurality of training regions including one or more of a training background region, a training sclera region, a training pupil region, and a training iris region.

13. The method of claim 11, wherein the glint detection GT data includes a manually created identification of glint locations.

14. The method of claim 11, wherein the error data includes one or more of:
a difference between the training 2D pupil center data and the 2D pupil center GT data;
a difference between the training eye segmentation data and the eye segmentation GT data;
a difference between the training glint detection data and the glint detection GT data; or
an error based on the training cornea center data and one or more geometric constraints.

15. An optical device comprising:
a camera; and
a processor communicatively coupled to the camera and configured to perform operations including:
receiving, from the camera, an input image of an eye of a user;
providing the input image of the eye of the user to a neural network having a plurality of layers, the neural network having been previously trained using a plurality of training input images;
generating, using the neural network, network output data that includes two-dimensional (2D) pupil data and cornea center data, wherein a first subset of the plurality of layers are used to generate the 2D pupil data and a second subset of the plurality of layers are used to generate the cornea center data, wherein the first subset and the second subset share at least one common layer, and wherein each of the first subset and the second subset includes at least one unique layer; and
computing, based on the network output data, a gaze vector corresponding to the eye of the user.

16. The optical device of claim 15, further comprising:
a plurality of infrared (IR) light-emitting diodes (LED).

17. The optical device of claim 15, wherein the network output data further includes:
eye segmentation data.

18. The optical device of claim 15, wherein the 2D pupil data includes a 2D pupil center.

19. The optical device of claim 17, wherein the eye segmentation data includes a segmentation of the eye of the user into a plurality of regions including one or more of a background region, a sclera region, a pupil region, or an iris region.

20. The optical device of claim 15, wherein the neural network was previously trained by:
for each training input image of a plurality of training input images:
providing the training input image to the neural network;
generating, using the neural network, training network output data;
receiving ground-truth (GT) data;
computing error data based on a difference between the training network output data and the GT data; and
modifying the neural network based on the error data.

* * * * *